(12) United States Patent
Fuller et al.

(10) Patent No.: US 7,732,939 B2
(45) Date of Patent: Jun. 8, 2010

(54) MULTI-FUNCTIONAL LRM PERFORMING SSPC AND ELCU FUNCTIONS

(75) Inventors: Randy J. Fuller, Hillsburgh (CA); Zhenning Z. Liu, Mississauga (CA); Milind Ghanekar, Mississauga (CA); Ted J. Gayowsky, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 190 days.

(21) Appl. No.: 11/873,091

(22) Filed: Oct. 16, 2007

(65) Prior Publication Data

US 2008/0231112 A1 Sep. 25, 2008

Related U.S. Application Data

(60) Provisional application No. 60/896,208, filed on Mar. 21, 2007.

(51) Int. Cl.
*B60L 1/00* (2006.01)
*B60L 3/00* (2006.01)
*H02G 3/00* (2006.01)

(52) U.S. Cl. .................................. 307/9.1; 307/64
(58) Field of Classification Search .................. 307/9.1, 307/43, 64–65, 18
See application file for complete search history.

(56) References Cited

U.S. PATENT DOCUMENTS

| 6,046,899 A * | 4/2000 | Dougherty .................. 361/173 |
| 6,462,926 B1 * | 10/2002 | Zaretsky et al. ............. 361/103 |
| 7,007,179 B2 | 2/2006 | Mares et al. |
| 7,193,337 B2 | 3/2007 | Nguyen |
| 7,205,681 B2 | 4/2007 | Nguyen |
| 2002/0199131 A1 * | 12/2002 | Kocin ........................... 714/14 |
| 2005/0185352 A1 * | 8/2005 | Nguyen ..................... 361/90 |
| 2007/0081284 A1 | 4/2007 | McAvoy et al. |

FOREIGN PATENT DOCUMENTS

WO    WO 02087051    10/2002

* cited by examiner

*Primary Examiner*—Fritz M Fleming
*Assistant Examiner*—Carlos Amaya
(74) *Attorney, Agent, or Firm*—Oral Caglar, Esq.

(57) ABSTRACT

On an aircraft, primary power distribution control and secondary power distribution control may be performed with a single line replaceable module (LRM) having an integrated architecture. The LRM may be provided with trip engines that are based on digital signal processors (DSP's). The DSP's may be programmed to allow the trip engines to perform either ELCU functions or SSPC functions. Use of the single LRM precludes a need for complex circuitry that might otherwise be required to coordinate prior-art independent ELCU and SSPC controls.

12 Claims, 3 Drawing Sheets

MULTI-FUNCTIONAL LRM PERFORMING SSPC AND ELCU FUNCTIONS

CROSS-REFERENCE TO RELATED APPLICATIONS

This application claims the benefit of U.S. Provisional Application No. 60/896,208 filed Mar. 21, 2007.

BACKGROUND OF THE INVENTION

The present invention is in the field of power distribution systems and, more particularly, power distribution systems which operate in vehicles such as aircraft.

In a typical prior art aircraft, power distribution control is performed with two or more independent systems which are distinctly different from one another. A first system may control primary power distribution. Primary power distribution may comprise wiring and contactors for high amperage circuitry. This high amperage circuitry may be considered electrical trunk lines. A second system may control secondary power distribution on relatively low amperage branch circuitry.

Some control units for aircraft secondary power systems are typically configured as modules which can be replaced as needed. These replaceable modules are referred to as "line replaceable modules" or LRM's. This type of LRM may utilize solid state devices and it may be referred to as a "solid state power control" or an SSPC.

In a typical prior-art aircraft, a separate "electrical load control unit" (ELCU) may be employed to control power primary distribution. Electronic architecture of a typical prior art ELCU is distinctly different from that of a prior art SSPC. But, all elements of an aircraft electrical system must be able to operate in a coordinated manner to achieve the singular purpose of controlling and operating the aircraft. In order to achieve this requisite coordinated electrical operation, there is a requirement for complex circuitry which provides coordination between the distinctive architectures of the prior art ELCU's and SSPC's. This coordinating circuitry is expensive, and because of its complexity, it is subject to possible failure.

Additionally, use of multiple control systems to perform control functions contributes to increased cost and weight of an aircraft and increased maintenance costs. When an aircraft employs different control systems for electrical power control, there is an obvious need for additional inventory of spare parts for the aircraft.

As can be seen, there is a need to provide a system of power distribution control which precludes a need for complex circuitry to coordinate operation of two or more different electronic architectures. Additionally, there is a need to reduce the number of components required for control of electrical power distribution and thereby reduce weight and operational costs of an aircraft.

SUMMARY OF THE INVENTION

In one aspect of the present invention a power distribution control module comprises at least two channels for performing power distribution control. At least one of the channels is configured to perform primary power distribution control At least one of the channels is configured to control secondary power distribution.

In another aspect of the present invention line replaceable module (LRM) for controlling power distribution in an aircraft comprises a channel for controlling secondary power distribution in the aircraft and a channel for controlling primary power distribution in the aircraft. The channels have the same electronic architecture.

In still another aspect of the present invention a method for controlling power distribution in a vehicle comprises the steps of monitoring primary and secondary power load information, collecting the primary and secondary power load information in processors having a common architecture, comparing the collected load information with desired parameters in the processors, controlling primary distribution in response to the comparison, and controlling secondary power distribution in response to the comparison.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in controlling vehicle power distribution. More particularly, the present invention may provide coordinated control for distribution of both primary and secondary power on the vehicle. The present invention may be particularly useful in vehicles such as aircraft which utilize line replaceable modules or LRM's for power distribution control.

In contrast to prior-art power distribution control systems, which employ multiple LRM's for control of power distribution, among other things, the present invention may provide for control of both primary and secondary power distribution on a single LRM. The present invention, instead of utilizing differing prior art architectures for primary and secondary control, may employ a single novel architecture based on digital signal processors (DSP's) to perform both of these functions. Additionally, use of a single LRM for these functions, in contrast to multiple LRM's, may provide for a reduced inventory of spare parts for the vehicle.

Figure 1:
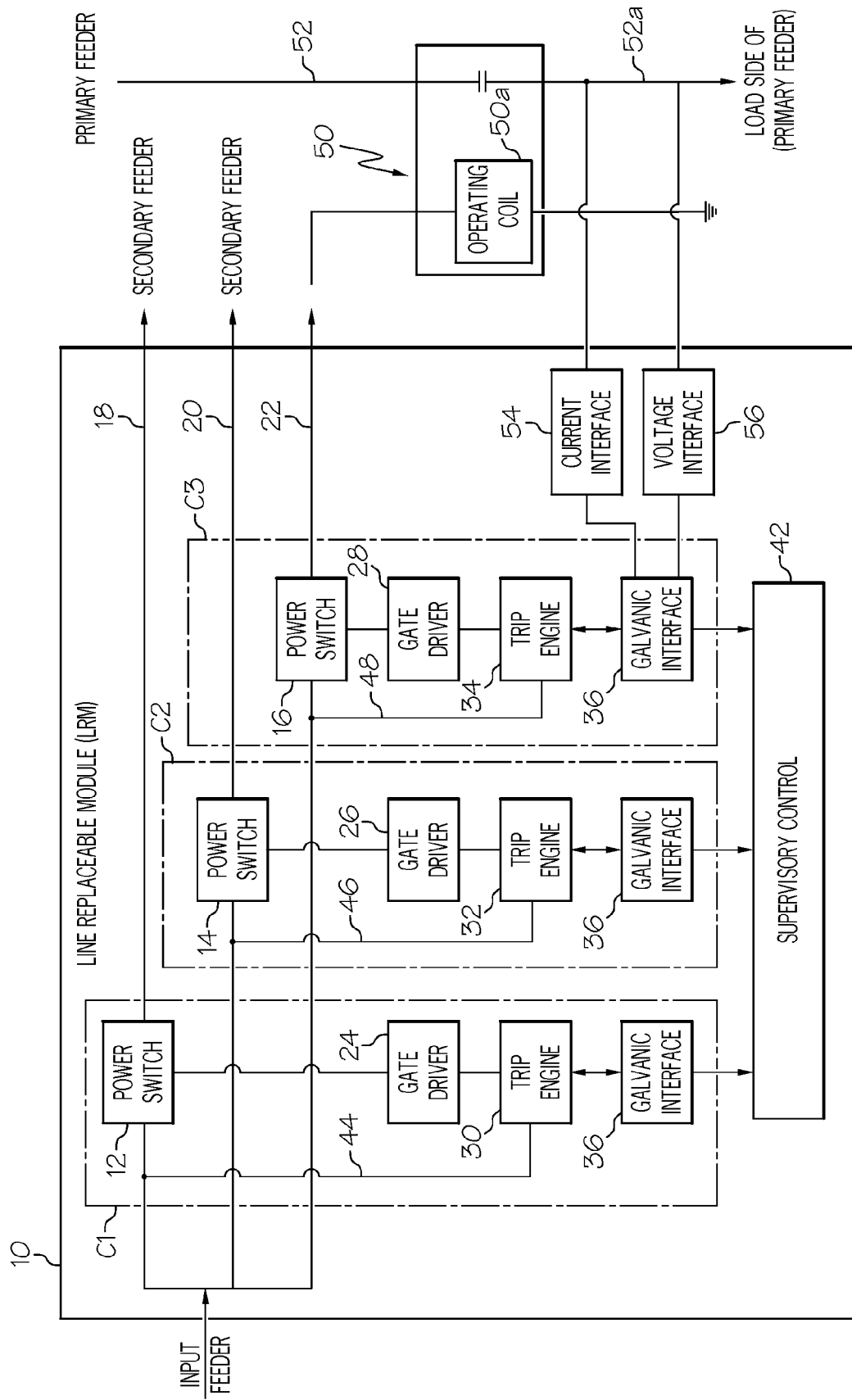
FIG. 1 is a block diagram a power distribution control system in accordance with the present invention.

Referring now to FIG. 1, a power distribution control module or Line Replaceable Module 10 (hereinafter LRM 10) is configured to perform both primary power distribution control and secondary power distribution control. The LRM may comprise a plurality of channels, for example channels C1, C2 and C3. Each of the channels C1, C2 and C3 may comprise power switches, 12, 14 and 16 respectively, gate drivers 24, 26 and 28 respectively, trip engines 30, 32 and 34 respectively and current feedbacks 44, 46 and 48 respectively. The switches 12 and 14 may control current through secondary feeders 18 and 20 respectively. The power switch 16 may control current through a control conductor 22. The switches 12, 14 and 16 may be solid state switches such as MOSFETS. Each of the switches 12, 14 and 16 may be interconnected, through gate drivers 24, 26 and 28, to trip engines 30, 32 and 34 respectively. Each of the trip engines 30, 32 and 34 may be interconnected, through galvanic interfaces 36 to a supervisory control 42. The trip engines 30, 32 and 34 may also be interconnected with the secondary feeders 18 and 20 and the control conductor 22 through current feedback connectors 44, 46 and 48 respectively.

At least one of the trip engines, in an exemplary case, trip engine 34, may be interconnected with a three-phase contactor 50. The contactor 50 may provide for control of primary three-phase current in a primary feeder 52. An operating coil 50a of the contactor 50 may be interconnected with the power switch 16 through the control conductor 22. A load side 52a of the primary feeder 52 may be interconnected with the trip engine 34 through a current interface 54 and a voltage interface 56.

In operation, the LRM 10 may provide control of current through any number of secondary feeders such as the secondary feeders 18 and 20 or any number of control conductors such as the control conductor 22. FIG. 1 shows only two secondary feeders merely as an exemplary illustration of the invention. The LRM 10 may also control current in any number of primary feeders such as the primary feeder 50. FIG. 1 shows only one primary feeder merely as an exemplary illustration of the invention.

Figure 2:
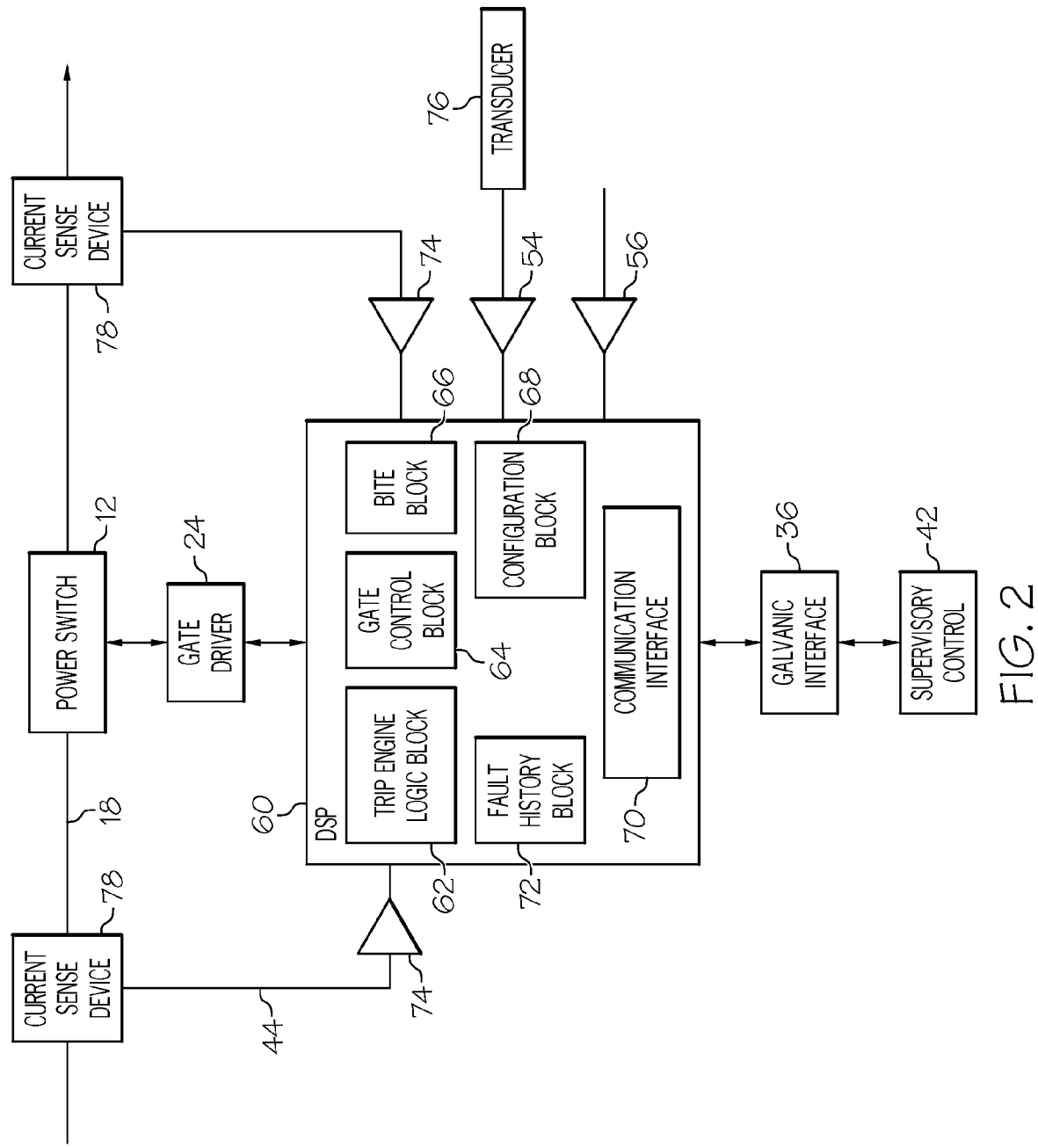
FIG. 2 is a block diagram of a portion of the control system of FIG. 1 in accordance with the present invention.

Each of the trip engines 30, 32 and 34 may comprise a DSP such as a DSP 60 shown in FIG. 2. The DSP's 60 may be programmed with software algorithms to accept current and voltage sensing data from the feedback connectors 44, 46 or 48 or from remote sensors (not shown) This sensing data may be combined with circuit trip parameters (e.g. channel rating, maximum trip current and decay time) so that the trip engines 30, 32 or 34 may perform their respective desired functions.

In a first programmed configuration some of the trip engines, trip engines 30 and 32 for example, may produce functionality of their associated switches 12 and 14 in a secondary power distribution control mode, sometimes referred to as an SSPC mode. In this SSPC mode, either of the switches 12 or 14 may act to directly interrupt excessive current that may be flowing to secondary loads (not shown) through either of the secondary feeders 18 or 20. In this regard, the switches 12 and 14 may be considered to be operable in a circuit breaker mode.

In a second alternate programmed configuration, one of the trip engines, trip engine 34 for example, may produce functionality of its associated switch 16 so that the contactor 50 may be operated. The switch 16 may interrupt current in the control conductor 22 and thus produce operation of the operating coil 50a of the contactor 50. In this context the trip engine 34 may be considered to be operating in a primary power distribution control mode, sometimes referred to as an Electrical Load Control Unit (ECLU) mode. This ECLU mode of operation may be considered as an indirect current interruption mode. This indirect current interruption mode of operation may be useful for high current levels that may develop in primary power distribution circuits of a vehicle. Typically such primary power circuits may carry current in excess of about 50 amps in a three-phase distribution system. Such high currents may require mechanical contactors (e.g. the contactor 50) for interruption. Solid state switches such as the switches 12, 14 and 16 may not be suitable for direct interruption of such high currents.

It may be seen that both SSPC functions and ECLU functions may be performed by a single one of the LRM's 10. Each of the channels C1, C2 and C3 may be programmed for functionality as either a circuit breaker or a load management controller for secondary power systems. Each of the trip engines 30, 32 and 34 may also be programmed to provide indirect current interruption for primary power distribution systems.

Referring now to FIG. 2 it may be seen how the DSP 60 may be configured to function in an SSPC mode or in an ELCU mode. The DSP 60 may be programmed with various logic blocks. For example there may be a trip engine block 62, a switch and gate control block 64 and a built in test equipment (BITE) block 66. The DSP 60 may also comprise a configuration block 68, a communication interface 70 and a non-volatile fault history block 72

The trip engine block 62 may be programmed with load management or circuit breaker trip algorithms such as those described in U.S. Patent Application Publication 20070014066 which is incorporated herein by reference. The switch and gate control block 64 may perform gating control for one of the power switches, for example the power switch 12, based on trip engine commands from the trip engine block 62. BITE information from the BITE block 66, and on/off commands from the communication interface 70. The BITE block 66 may test the switch 12, to validate correct operation. The configuration block 68 may be programmed to contain specified electrical load parameters of aircraft components. By way of example, such load parameters may include allowable current limits for particular conductors and allowable current overloads for predetermined limited time periods or load management hierarchy. The communication interface 70 may be programmed to provide commands from the supervisory controller 42 and may also provide BITE, status of the switch 12 and current feedback from the feedback connector 44.

Various current interfaces 74 may introduce information from one or more current sense devices 78. The current interfaces 74 may provide a scaled analog signal to the DSP 60. In the SSPC mode, the DSP 60 may provide a circuit breaker function. The circuit breaker functionality may be directed to protecting secondary wiring in the event of a downstream fault. The DSP 60 may also provide status information and reset functionality.

Referring now to FIGS. 1 and 2, it may be seen that the LRM 10 may operate in an ELCU mode to control primary power distribution with one or more of the contactors 50. In this ELCU mode, one of the trip engines, for example the trip engine 34, may receive current inputs from the remote current transducer 76 through the current interface 54. The trip engine 34 may also receive voltage inputs through the voltage interface 56. In a typical three-phase power system, the trip engine 34 may receive a separate current input and a separate voltage input for each of the phases. The trip engine 34 may comprise one of the DSP's 60 of FIG. 2. The DSP 60 of the trip engine 34 may be operated with the same trip algorithm as that described above with respect to an SPPC mode of operation. In the case of an ELCU mode of operation the configuration block 68 may be provided with aircraft electrical load parameters relating to primary power distribution. In this ELCU mode of operation, the trip engine 34 may be employed to activate the switch 16 to control the contactor 50 in the event of primary power overloading.

The trip engine 34 may be provided with one of the BITE blocks 66 of FIG. 2 so that continual testing of the contactor 50 may be performed. Various parameters of the contactor 50 may be continually monitored and recorded. These parameters may include contactor coil condition, contactor open circuit, contactor short circuit or mechanical condition of the contactor 50 (e.g. whether the contactor 50 is stuck open or closed).

It may be seen that the LRM 10 of FIG. 1 may utilize the same electronic architecture to perform both primary and secondary power distribution control. As a consequence, there is no need for prior-art coordination circuitry that might be otherwise required to coordinate operations of prior-art primary and secondary power distribution control systems with differing electronic architectures.

By way of example, the present invention is herein described with the trip engines 30 and 32 performing in an SSPC mode, while the trip engine 34 is herein described performing in an ELCU mode. It should be noted that the LRM 10 of FIG. 1 may be configured to permit any of the trip engines 30, 32 or 34 to perform in either the SSPC mode or the ELCU mode. The choice of mode may be made by merely selecting a particular programmed configuration for the DSP's 60 of the trip engines 30, 32 or 34.

Figure 3:
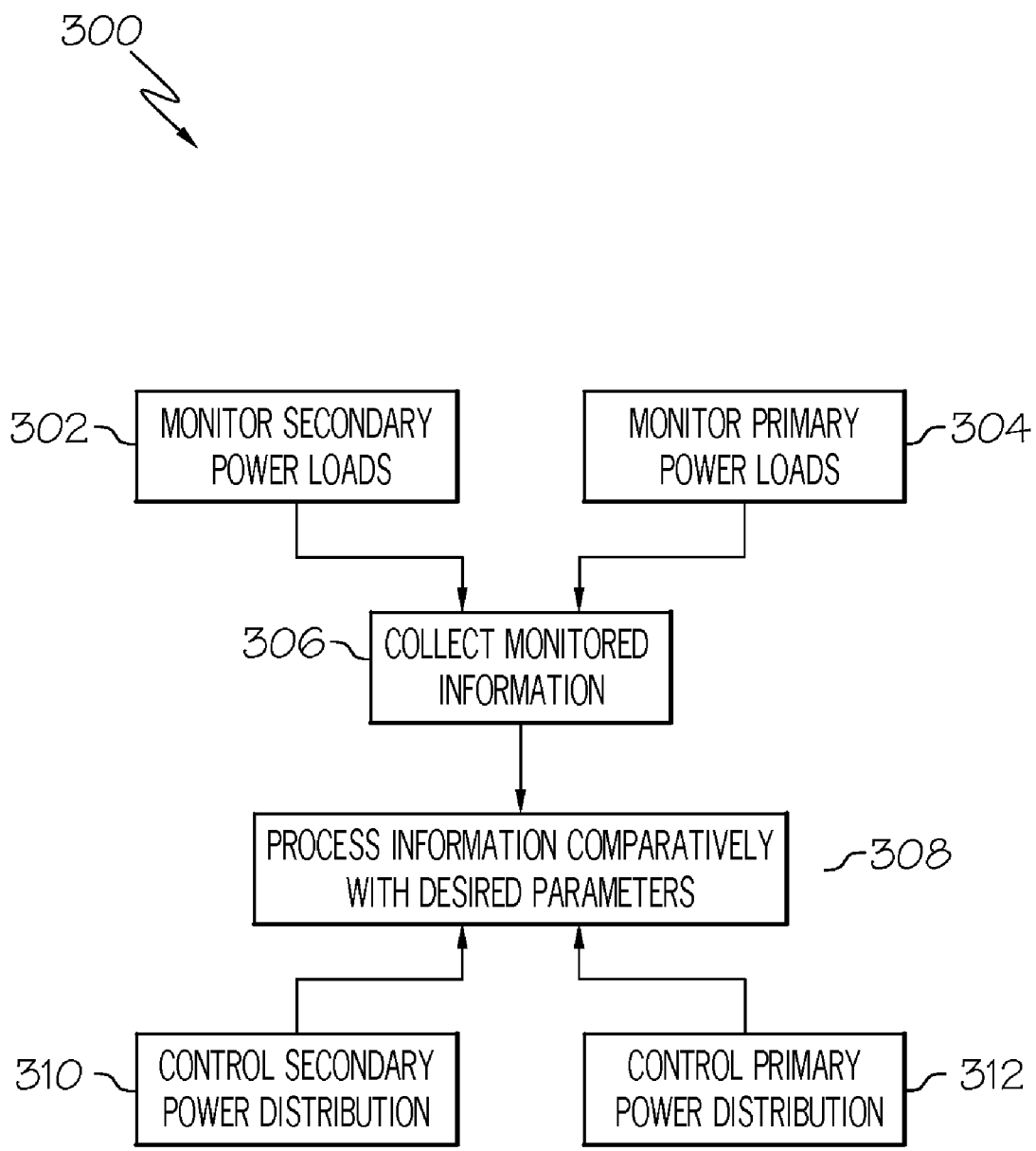
FIG. 3 is a flow chart of a method controlling power distribution in accordance with the present invention.

In one embodiment of the present invention, a method is provided for controlling power distribution on a vehicle such as, for example, an aircraft. In that regard the method may be understood by referring to FIG. 3. In FIG. 3, a flow chart portrays various aspects of an inventive method 300.

In a step 302 secondary power loads, (e.g. currents in the secondary feeders 18 and 20) may be continually monitored. The step 302 may be performed by transmitting current flow information (e.g. from the current sense devices 78) through the feedback connectors 44 and 46 to the trip engines 30 and 32 of FIG. 1.

In a step 304 primary power loads (e.g. three-phase primary loads connected to the load side 52a of the primary feeder 52) may be continually monitored. The steps 304 may be performed by transmitting voltage and current information through the interfaces 54 and 56 to the trip engine 34 of FIG. 1.

In a step 306 monitoring information may be collected in an LRM (e.g. LRM 10). Step 306 may be performed, for example, by collecting the monitoring information within a DSP (e.g. the DSP 60 of FIG. 2).

In a step 308 information collected in step 306 may be compared against desired electrical load parameters within the LRM 10. Step 308 may be performed in one of the DSP's 60 that has been programmed with aircraft electrical load data (e.g. in the configuration block 68 of FIG. 2).

In a step 310 secondary power distribution may be controlled. In a step 312 primary power distribution may be controlled. Steps 310 and 312 may be performed through operation of gates (e.g. the gates 24, 26 or 28) which may be interconnected with solid state power switches (e.g. the switches 12, 14 or 16 of FIG. 1). The gates may be activated by the DSP's 60.

It should be understood, of course, that the foregoing relates to exemplary embodiments of the invention and that modifications may be made without departing from the spirit and scope of the invention as set forth in the following claims.

We claim:

1. A power distribution control module comprising:
at least two channels for performing power distribution control;
at least two outputs from the power distribution control module, each of the at least two outputs corresponding to each of the at least two channels;
at least one of the channels configured to perform primary power distribution control to supply power, via a first of the at least two outputs, at a first amperage;
at least one of the channels configured to perform secondary power distribution control to supply power, via a second of the at least two outputs, at a second amperage, the second amperage being lower than the first amperage;
a primary power distribution contactor in a primary power feeder;
a first power switch connected to directly interrupt current in a secondary power feeder; and
a second power switch connected to indirectly interrupt current in a primary power feeder by disconnecting the primary power distribution contactor.

2. The module of claim 1 wherein the at least two channels comprise trip engines that are constructed with the same electronic architecture.

3. The module of claim 2 wherein the trip engines comprise digital signal processors (DSP's) which are programmed with the same trip algorithm.

4. The module of claim 1 wherein the module is configured as a single line replaceable module.

5. The module of claim 1 further comprising a built in test block connected to provide continuous testing of a primary power contactor.

6. A line replaceable module (LRM) for controlling power distribution in an aircraft comprising:
a trip engine for controlling secondary power distribution in the aircraft; and
a trip engine for controlling primary power distribution in the aircraft; wherein
the trip engines having the same electronic architecture, and wherein
at least one of the trip engines comprises a microprocessor device comprising;
a trip engine logic block; and
a configuration block;
the configuration block being programmed with aircraft electrical load parameters;
the trip engine logic block being programmed with a trip algorithm and being interconnected to a current feedback connector;
the trip engine being interconnected with a solid state power switch;
the solid state power switch being connected to directly interrupt current in a secondary power feeder;
the solid state power switch being operated responsively to a determination, by the microprocessor device, that current flow in the power feeder exceeds at least one of the aircraft electrical load parameters programmed in the configuration block; whereby the trip engine provides circuit breaker functionality that is coordinated with the aircraft load parameter.

7. The LRM of claim 6 wherein:
the microprocessor device is a digital signal processor (DSP); and
the DSP's are programmable so that either of the trip engines may perform secondary power distribution control functions and so that either of the trip engines may perform primary power distribution control functions .

8. A method for controlling power distribution in a vehicle, comprising the steps of:
monitoring primary and secondary power load information;
collecting the primary and secondary power load information in processors having a common architecture;
comparing the collected load information with desired parameters in the processors;
controlling primary power distribution with a primary power distribution trip engine in response to the comparison;

controlling secondary power distribution with a secondary power distribution trip engine in response to the comparison;

directly interrupting current in a secondary power feeder with a secondary power distribution solid state power switch interconnected with the secondary power distribution trip engine; and indirectly interrupting current in a primary power feeder with a primary power distribution contactor interconnected with the primary power distribution trip engine.

9. The method of claim 8 wherein the step of controlling secondary power distribution comprises load management.

10. The method of claim 8 further comprising the steps of:
performing testing of power switches to validate correct operation.

11. The method of claim 8 further comprising the step of performing testing of the contactor to determine condition of the contactor.

12. The method of claim 8 wherein the step of controlling primary power distribution comprises operating a solid state power switch to control the contactor.

* * * * *